United States Patent
Maslov et al.

(10) Patent No.: US 6,787,951 B2
(45) Date of Patent: Sep. 7, 2004

(54) ROTARY ELECTRIC MOTOR HAVING CONTROLLER AND POWER SUPPLY INTEGRATED THEREIN

(75) Inventors: Boris A. Maslov, Reston, VA (US); Alexander V. Pyntikov, Ashburn, VA (US); Jing Lu, Herndon, VA (US)

(73) Assignee: Wavecrest Laboratories, LLC, Dulles, VA (US)

( * ) Notice: Subject to any disclaimer, the term of this patent is extended or adjusted under 35 U.S.C. 154(b) by 0 days.

(21) Appl. No.: 09/966,102

(22) Filed: Oct. 1, 2001

(65) Prior Publication Data
US 2003/0193250 A1 Oct. 16, 2003

(51) Int. Cl.⁷ ............................................. H02K 11/00
(52) U.S. Cl. ..................... 310/67 R; 310/216; 310/218; 310/259
(58) Field of Search ............................ 310/68 R, 67 R, 310/68 A, 70 R, 70 A, 74, 89, 194, 216, 217, 218, 254, 258, 259

(56) References Cited

U.S. PATENT DOCUMENTS

| 3,577,002 A | * | 5/1971 | Hall et al. ..................... 290/46 |
| 4,303,843 A | * | 12/1981 | Arnoux et al. ............. 310/67 R |
| 4,550,280 A | * | 10/1985 | Freise .......................... 318/701 |
| 4,683,391 A | * | 7/1987 | Higuchi ....................... 310/90.5 |
| 4,754,207 A | | 6/1988 | Heidelberg et al. ......... 318/259 |
| 4,786,834 A | | 11/1988 | Grant et al. .................. 310/194 |
| 4,864,176 A | | 9/1989 | Miller et al. ................. 310/194 |
| 4,908,540 A | * | 3/1990 | Motodate et al. ........... 310/240 |
| 4,990,809 A | * | 2/1991 | Artus et al. .................. 310/192 |
| 5,034,675 A | | 7/1991 | Nerowski et al. ........... 318/811 |
| 5,128,575 A | | 7/1992 | Heidelberg et al. |
| 5,164,623 A | * | 11/1992 | Shkondin .................. 310/67 R |
| 5,304,879 A | * | 4/1994 | Suzuki et al. ............. 310/67 R |
| 5,365,137 A | | 11/1994 | Richardson et al. ........ 310/258 |
| 5,726,560 A | * | 3/1998 | Eakman et al. ................ 322/89 |
| 5,825,108 A | * | 10/1998 | De Filippis ............... 310/67 R |
| 5,923,106 A | * | 7/1999 | Isaak et al. ................ 310/67 R |
| 6,278,210 B1 | * | 8/2001 | Fatula, Jr. et al. .......... 310/112 |
| 6,348,752 B1 | * | 2/2002 | Erdman et al. ............. 310/217 |
| 6,356,005 B1 | * | 3/2002 | Hsu ........................... 310/254 |
| 6,380,648 B1 | * | 4/2002 | Hsu ........................... 310/67 A |
| 6,400,059 B1 | * | 6/2002 | Hsu ........................... 310/254 |

FOREIGN PATENT DOCUMENTS

| DE | 195 03 492 | 8/1996 |
| DE | 197 04 576 A1 | 8/1998 |
| DE | 199 24 038 | 11/2000 |
| DE | 199 24 038 A1 | 11/2000 |
| EP | 0 006 669 A | 1/1980 |
| EP | 0 614 264 | 3/1994 |
| EP | 0 164 264 A1 | 9/1994 |
| EP | 0 866 547 A1 | 9/1998 |
| WO | WO 90/11641 A | 10/1990 |
| WO | WO 00/60724 | 10/2000 |

* cited by examiner

Primary Examiner—Dang Le
(74) Attorney, Agent, or Firm—McDermott Will & Emery LLP

(57) ABSTRACT

A rotary electric motor is formed within a cylindrical rotor housing structure that surrounds an annular stator ring. The permanent magnet rotor is configured in an annular ring coaxial with, and outside of, the stator. The stator ring contains a plurality of wound core segments that are ferromagnetically isolated from each other. The core segments are secured to a rigid skeletal structure that is centrally fixed to a stationary shaft. The stator support structure is formed of spine members that extend radially away from the center. U-shaped plates at the outer ends of the spine members engage adjacent pair of stator segments. Within the inner periphery of the stator ring, space is provided within which motor control circuitry and battery power supply may be incorporated.

13 Claims, 6 Drawing Sheets

ROTARY ELECTRIC MOTOR HAVING CONTROLLER AND POWER SUPPLY INTEGRATED THEREIN

RELATED APPLICATIONS

This application contains subject matter related to copending U.S. application Ser. No. 09/826,423 of Maslov et al., filed Apr. 5, 2001, and copending U.S. application Ser. No. 09/826,422 of Maslov et al., filed Apr. 5, 2001, both commonly assigned with the present application. The disclosures of both of these applications are incorporated by reference herein.

FIELD OF THE INVENTION

The present invention relates to rotary electric motors, more particularly to motor structure having electrical control and drive elements integrated therein.

BACKGROUND

The progressive improvement of electronic systems, such as microcontroller and microprocessor based applications for the control of motors, as well as the availability of improved portable power sources, has made the development of efficient electric motor drives for vehicles, as a viable alternative to combustion engines, a compelling challenge. Electronically controlled pulsed energization of windings of motors offers the prospect of more flexible management of motor characteristics. By control of pulse width, duty cycle, and switched application of a battery source to appropriate stator windings, functional versatility that is virtually indistinguishable from alternating current synchronous motor operation can be achieved. The use of permanent magnets in conjunction with such windings is advantageous in limiting current consumption.

The above-identified copending related U.S. patent application of Maslov et al., Ser. No. 09/826,422, identifies and addresses the need for an improved motor amenable to simplified manufacture and capable of efficient flexible operating characteristics. In a vehicle drive environment, it is highly desirable to attain smooth operation over a wide speed range, while maintaining a high torque output capability at minimum power consumption. Such a vehicle motor drive should advantageously provide accessibility to the various structural components for replacement of parts at a minimum of inconvenience. The copending related U.S. application incorporates electromagnet poles as isolated magnetically permeable structures configured in an annular ring, relatively thin in the radial direction, to provide advantageous effects. With this arrangement, flux can be concentrated, with virtually no loss or deleterious transformer interference effects in the electromagnet cores, as compared with prior art embodiments. While improvements in torque characteristics and efficiency are attainable with the structure of the identified copending application, further improvements remain desirable.

To this end, the above-identified copending related U.S. patent application of Maslov et al., Ser. No. 09/826,423, seeks to optimize rotor parameters such as the grade of the magnet, the energy density and the overall magnetic characteristics of the magnetic circuit, the size and the dimensions of which can adjust the permanence and the overall operating condition of the magnet when it is part of the rotor, the temperature stability of the magnet, magnet demagnetization, the finishing, coating and post processing steps taken in manufacturing of the magnets for the intended application, the stability of the magnetization over the curvilinear surface of the magnet, uniformity of the radial polarization of the magnet, the adjacent gap between two separate magnets, the mechanical features and geometry of the edges of the magnets, and the return flux path of the magnet as provided by a back iron ring section.

In environments in which portability and size are important factors, the need exists for drive motors that are capable of a wide range of operating characteristics, without sacrificing complex control functionality. Brushless motor systems must have the capability to control each of a plurality of electronic switches to provide accurate commutation sequencing and appropriate application of power to the individual stator windings. While the complexity of the electronic elements can be extensive and diverse, the need exists for a motor structural configuration in which the control elements that provide such operation are self-contained. Such a configuration should not be made at a sacrifice to cause limitations in the motor flux producing structure within a given constituent of the motor.

DISCLOSURE OF THE INVENTION

The present invention fulfills these needs, while taking advantage of the benefits of the isolated individual pole pair arrangements disclosed in the above identified Maslov et al. applications. The thin annular ring configuration of the stator is utilized to provide sufficient space in which to allocate a substantial portion, if not all, of a relatively complex electrical control system within the confines of the stator structure. Integration of the electrical control components within a shielded space internal to the stator flux producing structure provides several advantages. Simplification of integration and reduction of the number of individual discrete circuit elements are obtained while avoiding electromagnetic interference between the control circuit and the switched stator windings. When used, for example, in specific applications such as vehicle drives, the incorporation of both motor structure and the electrical control system within the vehicle wheel can provide a decrease in weight of the unit, while decreasing acoustic and mechanical noise. Operation from the user's perspective can be simplified to simulate, for example, conventional automobile operation.

The aforementioned advantages are manifested in structural features of the invention, at least in part, wherein the motor comprises a rotor and stator each disposed in an angular ring configuration and spaced from each other by an annular air gap. The stator comprises a plurality of magnetically permeable core segments with coils wound thereon, the core segments being separated from direct contact with each other and disposed along the radial air gap. The segments thus are individual electromagnets. The inner radial periphery of the stator defines a space within which substantially no flux traverses. A controller is contained within the space for applying energization current to the stator windings. Also provided within this space are a power supply and electronic switches responsive to the controller for directing current pulses from the power supply individually to the stator windings. The power supply may comprise a plurality of replaceable batteries that are readily accessible to the user. The batteries may be capable of being recharged from an external source with or without their removal from the stator. Battery recharge may also be effected by regenerative current applied during operation by the stator segment windings. A rotor position sensor within the stator provides at least one output connected to the controller.

Preferably, each stator segment comprises a pair of poles circumferentially spaced from each other at the outer periphery and joined together by a yoke or linking portion at the inner periphery, the pair of poles having opposite magnetic polarities at the air gap when energization current is supplied to the segment winding. The winding of each stator segment may comprise two coil sections formed on a respective stator pole, each section being wound in opposite directions and connected in either series or parallel to provide, when energized, stator poles of opposite magnetic polarity. Alternatively, each stator segment may contain a winding formed entirely on the yoke or linking portion. Each stator segment winding is connected to a bridge configuration of the electronic switches. The direction of current flow in a winding for an energization pulse is established by the selected activation of the switches of the bridge in accordance with controller signals.

The controller may comprise circuitry distributed on a plurality of circuit boards upon which switches are also mounted. Alternatively, the controller may comprise an application specific integrated circuit (ASIC) in a single chip which may also integrate the switches. The width of the current pulses and the selection of the switches are controlled by the controller in response to signals received from one or more rotor position sensors that are mounted within the stator.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the FIGUREs of the accompanying drawing and in which like reference numerals refer to similar elements and in which.

DETAILED DESCRIPTION OF THE INVENTION

Figure 1:
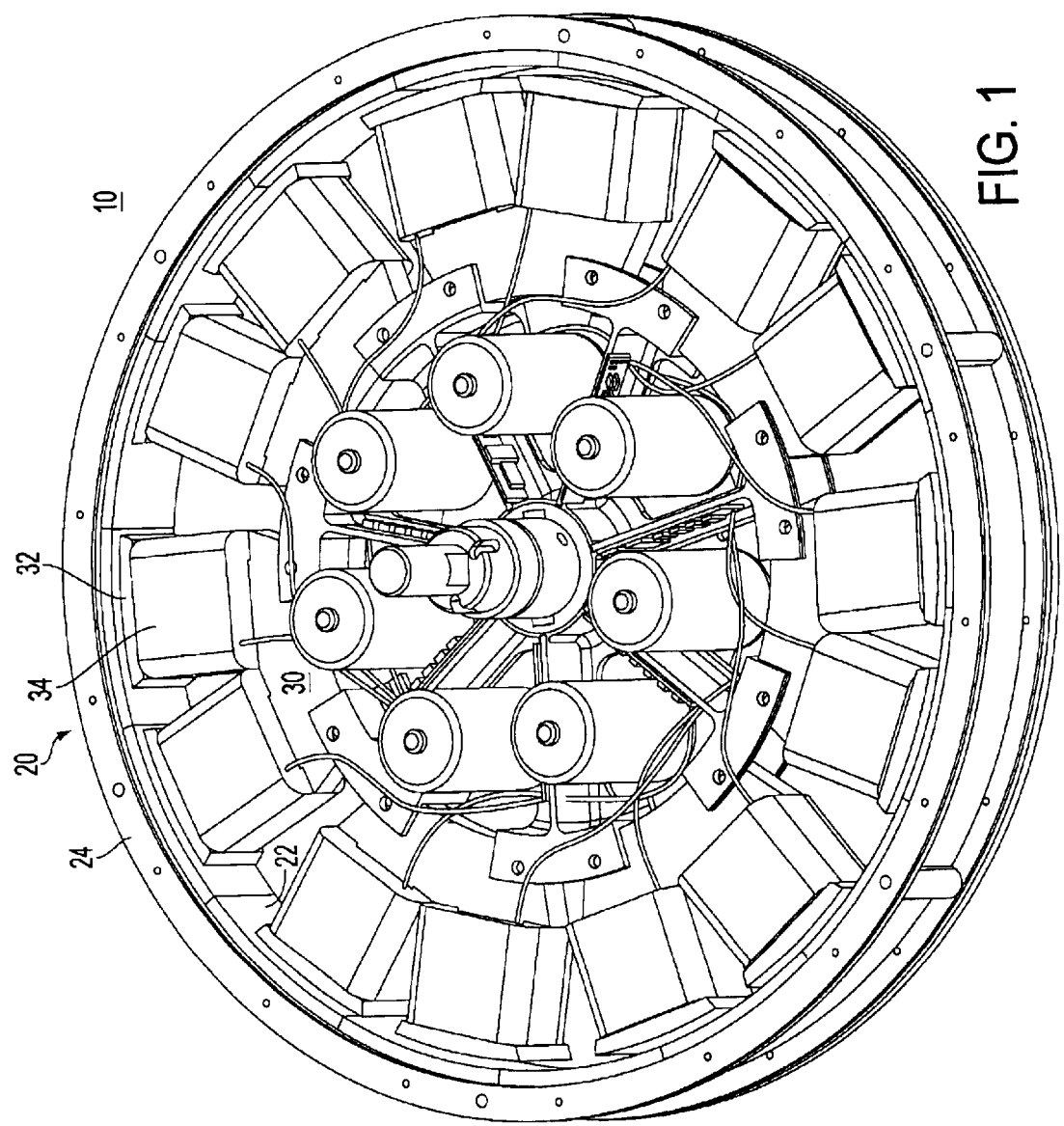
FIG. 1 is a partial three dimensional perspective view of a motor according to the present invention.

The motor of the present invention is suitable for use in driving a vehicle wheel of an automobile, motorcycle, bicycle, or the like. The drawing illustrations thus depict motor structure that can be housed within a vehicle wheel, the stator rigidly mounted to a stationary shaft and surrounded by a rotor for driving the wheel. It should be appreciated, however, that the vehicle context is merely exemplary of a multitude of particular applications in which the motor of the present invention may be employed.

Figure 2:
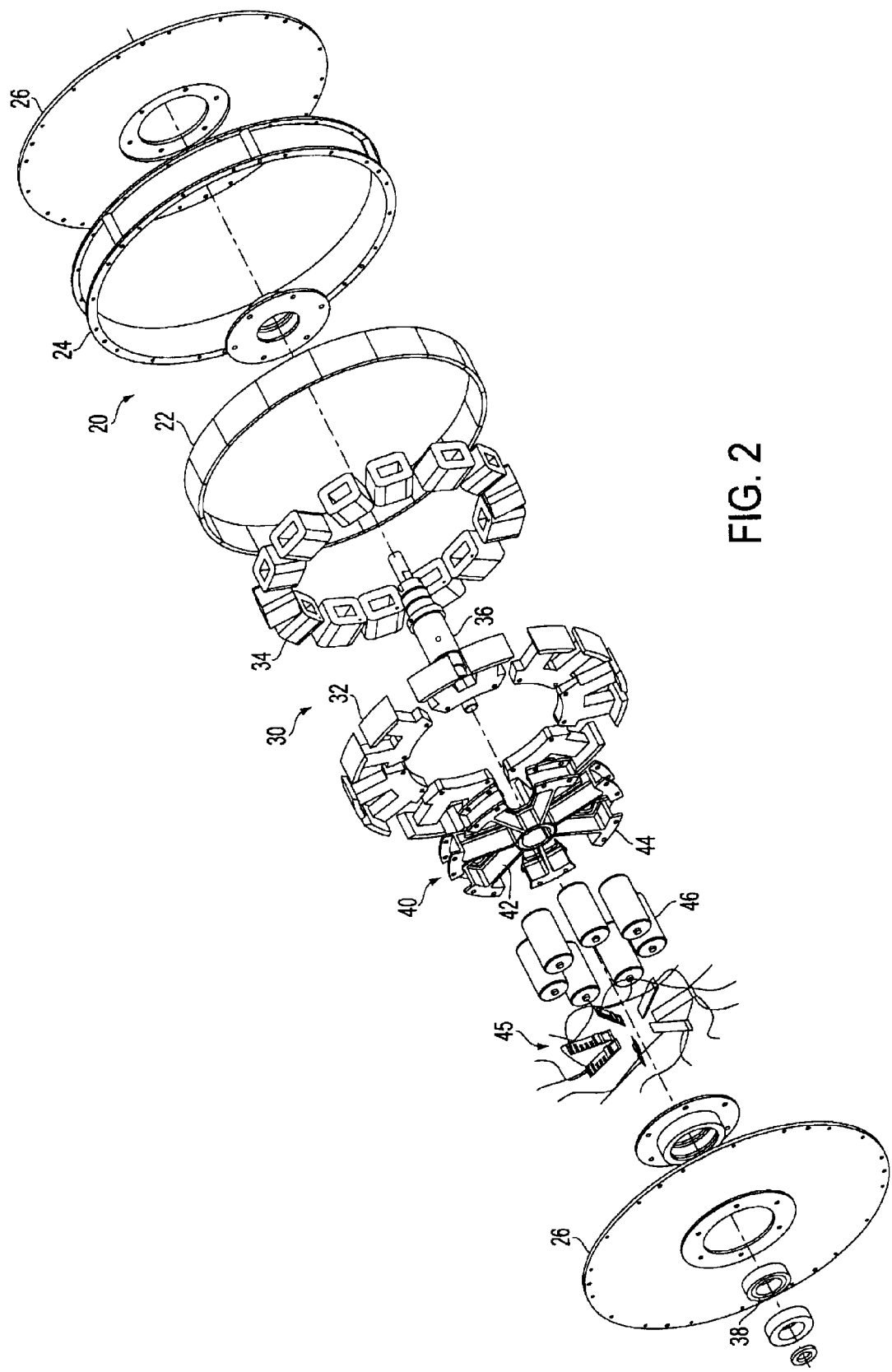
FIG. 2 is an exploded view of the structural components of the motor of FIG. 1 illustrative of the positional relationship among the various elements.

FIG. 1 is a cutaway drawing of the motor structure, the elements shown in more detail in the exploded view of FIG. 2. Motor 10 comprises annular permanent magnet rotor 20 and annular stator structure 30 separated by a radial air gap. The rotor and stator are configured coaxially about an axis of rotation, which is centered in stationary shaft 36. The stator comprises a plurality of ferromagnetically isolated elements, or stator groups. Core segments 32, made of magnetically permeable material separated from direct contact with each other, have respective winding portions 34 formed on each pole. Seven stator groups are shown, each group comprised of two salient electromagnet poles allocated circumferentially along the air gap. The rotor comprises a plurality of permanent magnets 22, circumferentially distributed about the air gap and affixed to a nonmagnetic annular back plate 24, which may be formed of aluminum or other non magnetically permeable material. The back plate is part of the motor housing to which is attached side walls 26.

The flux distributions produced by the rotor magnets may be enhanced by the provision of a magnetically permeable element, not shown, mounted to the back of the rotor magnets. Sixteen rotor magnets are shown. It is to be understood that the numbers of stator poles and rotor magnets illustrated are merely exemplary, as various ratios can be utilized, depending on desired operational parameters. For example, fewer electromagnets spaced at greater distances may produce different torque and/or speed characteristics. The stator core segments are secured to a rigid skeletal structure 40 that is centrally fixed to the shaft 36. Spine members 42, equal in number to the number of stator groups, extend radially away from the center of structure 40 to U-shaped plates 44. The U-shaped plate sides and the stator core segments contain mating holes by which the stator segments are fixed to the skeletal structure. Each U-shaped plate engages an adjacent pair of stator segments.

Each stator segment and adjoining pair of spine members together define a space within which circuit elements are contained. The rigid spine portions 42 have sufficient surface area to provide the necessary structural support as well as to accommodate circuit boards 45. A circuit board or hybrid module may be affixed to each spine portion in any conventional manner. Each circuit board contains the control circuit elements and switches needed for application of energizing current through appropriate wiring connections to a winding of a stator core segment to which the spine portion is attached. It should be appreciated that all control circuit elements and switches can be integrated into a single circuit board to provide even greater economy of space and weight. The motor power supply, represented by batteries 46, is also self-contained within the stator spaces. Appropriate receptacles (not shown) for the batteries can be fixed to the spine portions 42. The receptacles, which may be of any conventional variety, permit easy removal of the batteries for replacement or recharge. While a single battery for each space is shown, any commercially available battery type or battery pack that is of sufficient capacity to supply the necessary motor power may be used. Thus, depending on particular battery characteristics and motor drive requirements, it may be possible to use one or more spaces for location of other elements.

Figure 3:
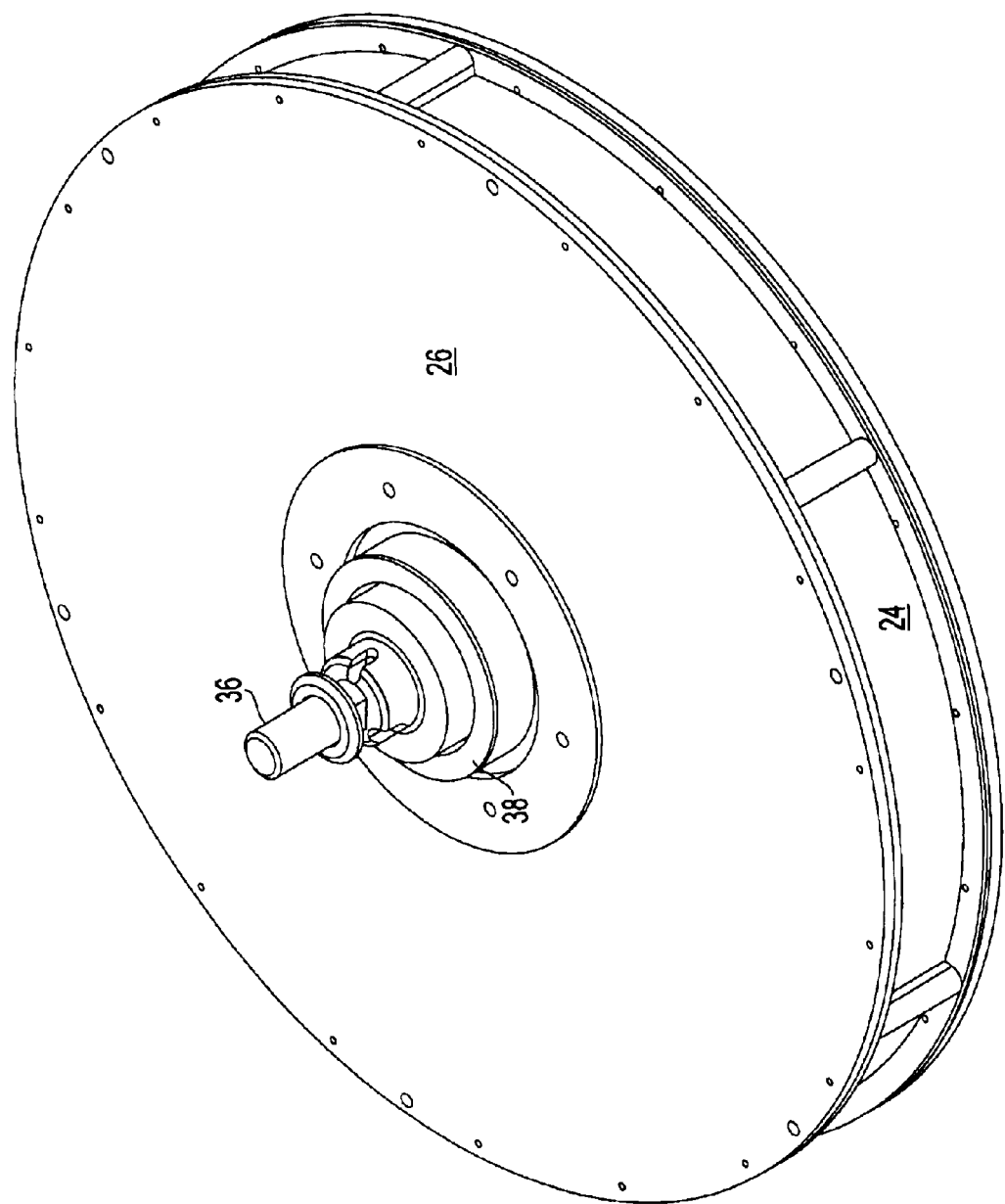
FIG. 3 is a perspective external view of the motor of FIGS. 1 and 2.

FIG. 3 is a three dimensional external view of the motor system of FIGS. 1 and 2. The rotor housing outer ring 24 and side walls 26 are configured to form a wheel hub on which a tire, not shown, can be mounted directly or indirectly via spokes. The rotor wheel housing is journalled for rotation about the stationary shaft 36 via bearings 38. The cylindrical rotor housing structure surrounds the stator annular ring that is coextensively aligned in the axial direction with the rotor across the air gap.

Figure 4:
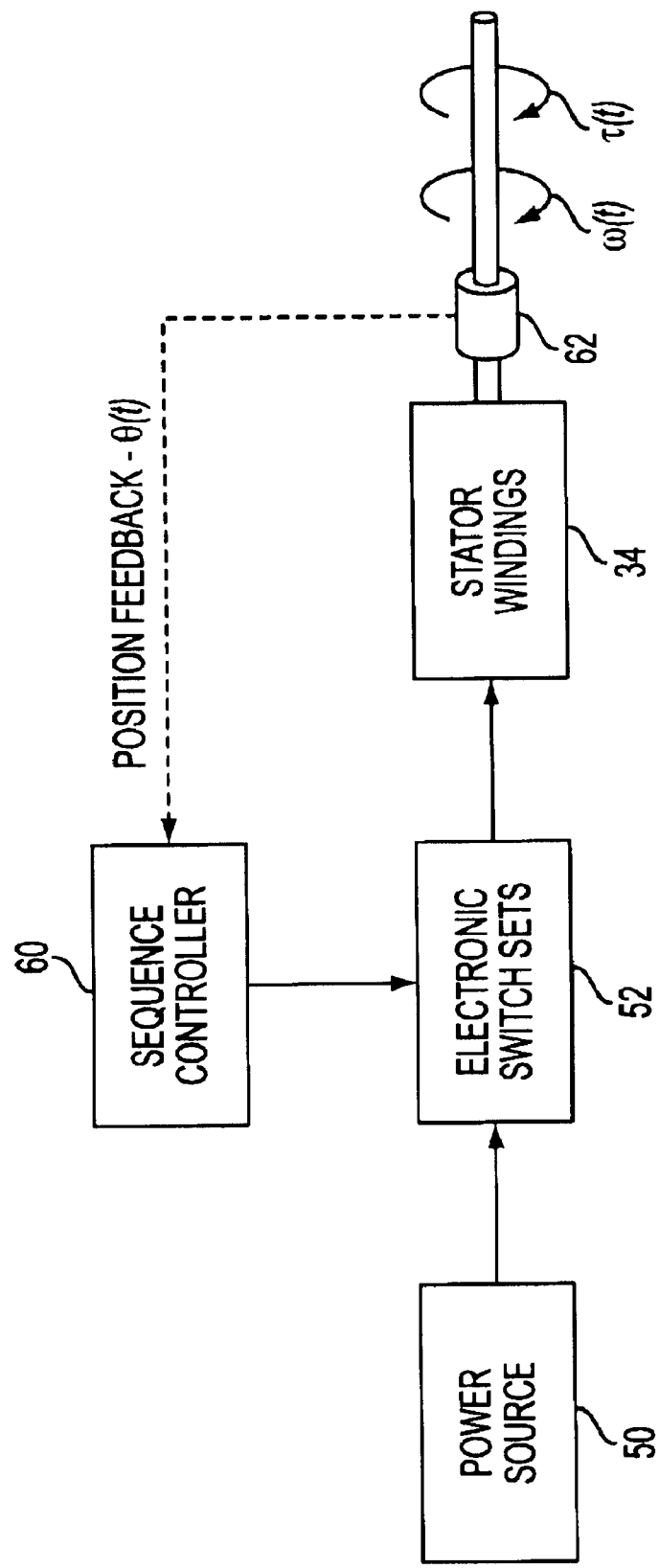
FIG. 4 is a block diagram of a control system suitable for use in the motor of FIGS. 1–3.

FIG. 4 is a block diagram of a typical control system that may be employed to drive the motor structure shown in FIGS. 1–3. Stator windings 34 are switchably energized by driving current supplied from power source 50 via electronic switch sets 52. Timing of the current pulses is subject to the control of sequence controller 60, which is responsive to feedback signals received from position sensor 62. Sequence controller may include a microprocessor or equivalent microcontroller. Although position sensor 62 is schematically represented by a single unit, several sensors may be appropriately positioned at stator sections along the air gap to detect rotor magnet rotation. The position sensor may comprise any known magnetic sensing devices, such as a Hall effect devices, giant magneto resistive (MGR) sensors, reed switches, pulse wire sensors including amorphous sensors, resolvers or optical sensors.

Figure 5:
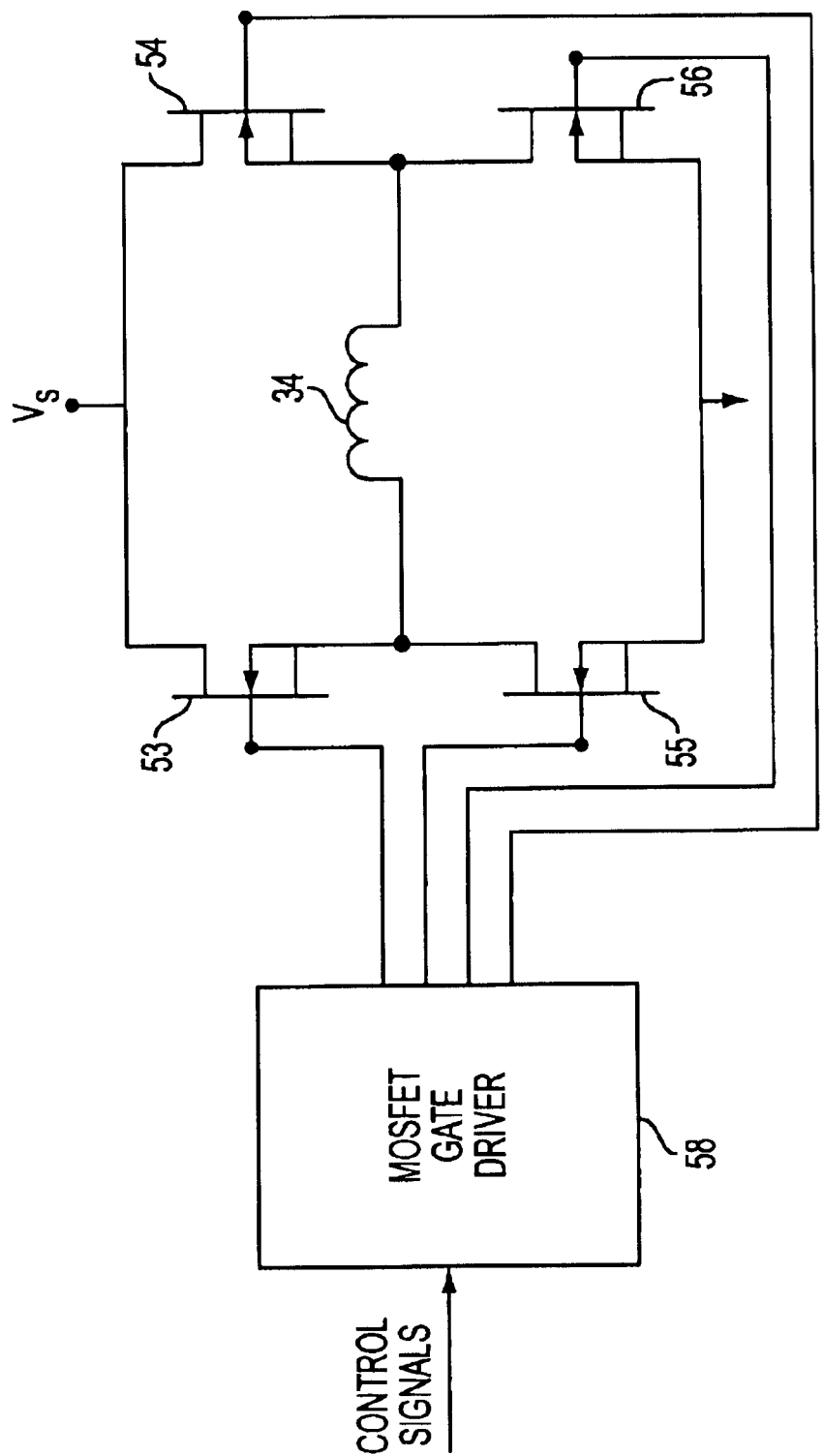
FIG. 5 is a partial block diagram for a winding switching circuit of the system of FIG. 4.

The use and control of electronic switches for application of energizing current to motor windings are common in the art. FIG. 5 is a partial circuit diagram of a switch set and driver for an individual stator core segment winding. Stator winding 34 is connected in a bridge circuit of four FETs. It is to be understood that any of various known electronic switching elements may be used for directing driving current in the appropriate direction to stator winding 34 such as, for example, bipolar transistors. FET 53 and FET 55 are connected in series across the power source, as are FET 54 and FET 56. Stator winding 34 is connected between the connection nodes of the two series FET circuits. Gate driver 58 is responsive to control signals received from the sequence controller 60 to apply activation signals to the gate terminals of the FETs. FETs 53 and 56 are concurrently activated for motor current flow in one direction. For current flow in the reverse direction, FETs 54 and 55 are concurrently activated. Gate driver 58 may be integrated in sequence controller 60 or comprise a separate driver circuit.

Figure 6:
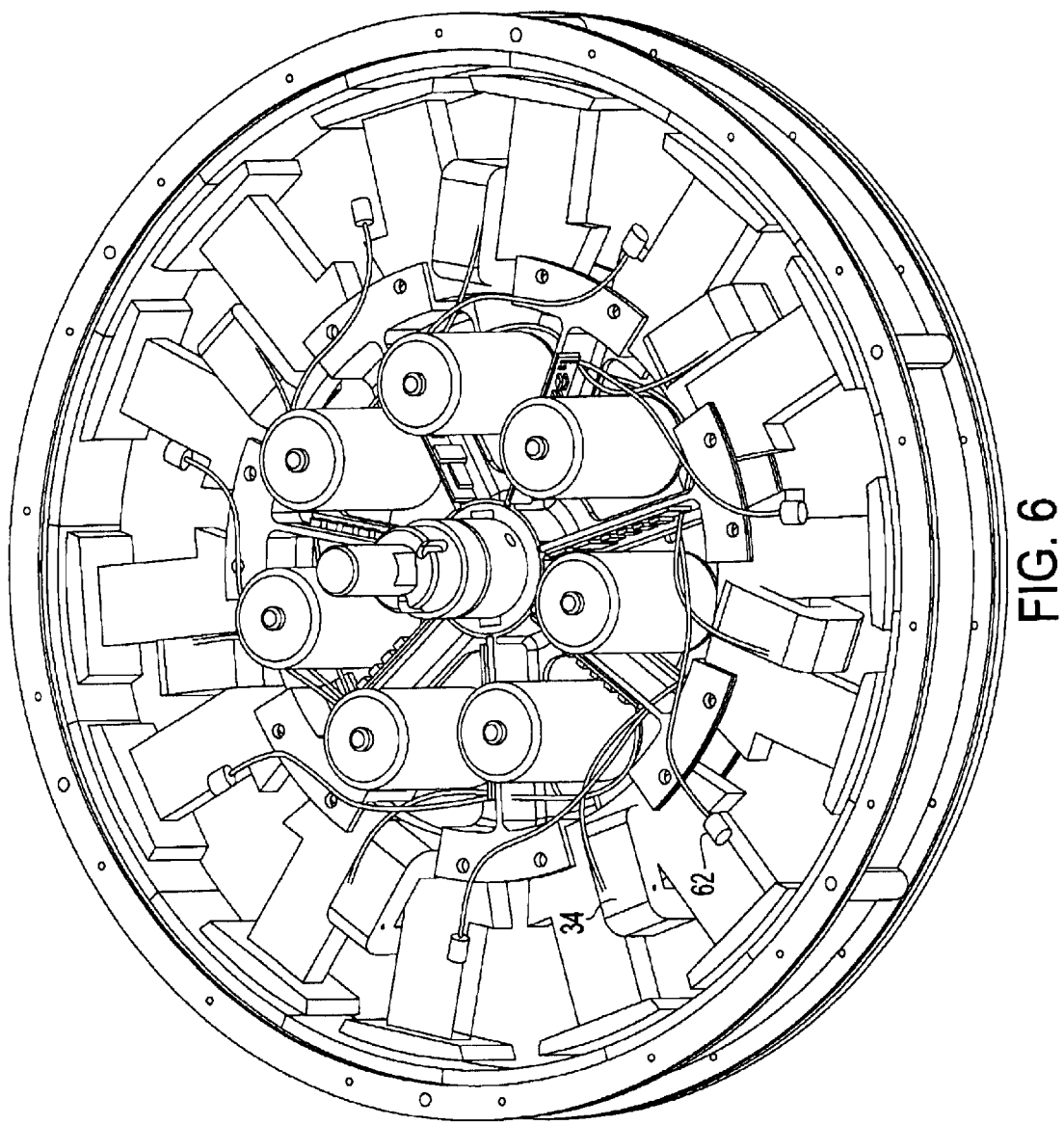
FIG. 6 is a partial three dimensional perspective view of a variation of the motor structural arrangement shown in FIG. 1.

FIG. 6 is a partial three dimensional perspective view of a variation of the motor structural arrangement shown in FIG. 1. Winding 34 of each stator core segment is formed on a core section that links the poles rather than split into two portions wound on the poles themselves. FIG. 6 also illustrates position sensors 62, each provided at a corresponding stator core section.

In this disclosure there is shown and described only preferred embodiments of the invention and but a few examples of its versatility. It is to be understood that the invention is capable of use in various other combinations and environments and is capable of changes or modifications within the scope of the inventive concept as expressed herein. For example, as can be appreciated, the motor of the invention can be utilized in a wide range of applications in addition to vehicle drives. While it is preferred, in the implementation of a vehicle drive, that the rotor surround the stator, other applications may find advantageous utility with the stator surrounding the rotor. Thus, it is within the contemplation of the invention that each inner and outer annular member may comprise either the stator or rotor and may comprise either the group of electromagnets or group of permanent magnets.

What is claimed is:

1. A rotary electric motor comprising:
    a rotor having a plurality of permanent magnets disposed in an annular ring configuration, the magnets alternating in magnetic polarity along an inner annular surface;
    a stator of annular ring construction encompassed within the rotor and separated therefrom by a radial air gap, the stator comprising:
        a plurality of ferromagnetic core segments ferromagnetically isolated from each other, each of the core segments having respective coils wound thereon to form stator windings;
        an outer radial periphery at the air gap; and
        an inner radial periphery defining an inner volume;
    wherein the said inner volume comprises a power supply, a controller and electronic switches responsive to the controller for applying energization current to the stator windings.

2. A rotary electric motor as recited in claim 1, wherein the stator further comprises a rotor position sensor having an output connected to the controller.

3. A rotary electric motor as recited in claim 1, wherein each stator segment comprises a pair of poles circumferentially spaced from each other at the outer periphery and joined together by a yoke or linking portion at the inner periphery, the pair of poles having opposite magnetic polarities at the air gap when energization current is supplied to the segment winding.

4. A rotary electric motor as recited in claim 2, wherein the winding of each stator segment comprises a winding portion on each stator pole, the winding portions of each pole pair being wound in opposite directions and connected in series.

5. A rotary electric motor as recited in claim 3, wherein the winding of each stator segment is formed on the yoke or linking portion.

6. A rotary electric motor as recited in claim 1, wherein the electronic switches are connected in bridge configurations, connected respectively to corresponding stator segment windings.

7. A rotary electric motor as recited in claim 6, wherein duration of the current directed to the stator windings and energization of the switches are controlled in response to signals received by the controller from a rotor position sensor.

8. A rotary electric motor as recited in claim 1, wherein said power supply comprises a plurality of replaceable batteries.

9. A rotary electric motor as recited in claim 8, wherein said batteries are rechargeable batteries capable of being recharged from an external source when removed from the stator and of being recharged by regenerative current applied by the stator segment windings.

10. A rotary electric motor as recited in claim 8, wherein said batteries are rechargeable from an external source.

11. A rotary electric motor as recited in claim 1, wherein said volume further comprises a circuit board having mounted thereon the controller and switches.

12. A rotary electric motor as recited in claim 11, wherein said controller comprises an application specific integrated circuit (ASIC).

13. A rotary electric motor as recited in claim 1, where said volume is substantially cylindrical.

* * * * *